(12) United States Patent
Ma

(10) Patent No.: US 11,087,361 B2
(45) Date of Patent: Aug. 10, 2021

(54) INFORMATION PROCESSING METHOD, TERMINAL, BACKGROUND SERVER AND SYSTEM, STORAGE MEDIUM

(71) Applicant: TENCENT TECHNOLOGY (SHENZHEN) COMPANY LIMITED, Shenzhen (CN)

(72) Inventor: Xuequan Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 514 days.

(21) Appl. No.: 16/053,067

(22) Filed: Aug. 2, 2018

(65) Prior Publication Data
US 2018/0341986 A1    Nov. 29, 2018

Related U.S. Application Data

(63) Continuation of application No. PCT/CN2017/085785, filed on May 24, 2017.

(30) Foreign Application Priority Data

Jun. 3, 2016  (CN) .......................... 201610393089.1

(51) Int. Cl.
*H04W 4/23*    (2018.01)
*G06F 16/958*    (2019.01)
(Continued)

(52) U.S. Cl.
CPC ..... *G06Q 30/0267* (2013.01); *G06F 9/45529* (2013.01); *G06F 16/958* (2019.01);
(Continued)

(58) Field of Classification Search
CPC . G06Q 30/0267; G06Q 30/0277; H04W 4/23; H04W 4/18; G06F 16/958;
(Continued)

(56) References Cited

U.S. PATENT DOCUMENTS 8,266,421 B2 *  9/2012  Sidman ................. H04L 9/0825
                                                 713/150
10,262,341 B2 *  4/2019  Cao .......................... H04L 67/02
(Continued)

FOREIGN PATENT DOCUMENTS

CN    102662966 A    9/2012
CN    103593354 A    2/2014
(Continued)

OTHER PUBLICATIONS

The World Intellectual Property Organization (WIPO) International Search Report for PCT/CN2017/085785 dated Sep. 1, 2017 5 Pages (including translation).
Indian Patent Office Examination report for Application No. 201837016981 dated Dec. 17, 2020, 7 pages.

*Primary Examiner* — Farid Homayounmehr
*Assistant Examiner* — Thanh T Le
(74) *Attorney, Agent, or Firm* — Anova Law Group, PLLC

(57) ABSTRACT

An information processing method is provided. The method includes acquiring a JavaScript (JS) template for filtering multimedia information from a backend server when determining a preset update condition is satisfied; and acquiring a filtering parameter corresponding to a target webpage from the backend server when detecting that a user requests to access the target webpage. The method also includes inserting the filtering parameter into the JS template; executing the JS template inserted with the filtering parameter, screening out multimedia information from webpage information displayed on the target webpage and shielding displaying of the multimedia information.

20 Claims, 7 Drawing Sheets

(51) Int. Cl.
*G06F 16/9535* (2019.01)
*G06F 40/186* (2020.01)
*H04W 4/18* (2009.01)
*G06Q 30/02* (2012.01)
*G06F 16/957* (2019.01)
*G06F 9/455* (2018.01)
*H04L 29/08* (2006.01)
*H04L 29/06* (2006.01)

(52) U.S. Cl.
CPC ...... *G06F 16/9535* (2019.01); *G06F 16/9577* (2019.01); *G06F 40/186* (2020.01); *G06Q 30/0277* (2013.01); *H04L 63/0428* (2013.01); *H04L 67/02* (2013.01); *H04W 4/18* (2013.01); *H04W 4/23* (2018.02)

(58) Field of Classification Search
CPC ............. G06F 16/9577; G06F 16/9535; G06F 40/186; G06F 9/45529; H04L 63/0428; H04L 67/02
USPC .......................................................... 713/153
See application file for complete search history.

(56) References Cited

U.S. PATENT DOCUMENTS

| | | | | |
|---|---|---|---|---|
| 2001/0037488 A1* | 11/2001 | Lee | .................. | G06Q 30/02 717/100 |
| 2006/0031379 A1* | 2/2006 | Kasriel | .................. | H04L 67/02 709/213 |
| 2006/0173783 A1* | 8/2006 | Marples | .............. | H04L 63/0428 705/51 |
| 2009/0106393 A1* | 4/2009 | Parr | .................. | H04L 67/28 709/218 |
| 2009/0307310 A1* | 12/2009 | Kim | .................. | H04N 7/17336 709/203 |
| 2010/0185687 A1 | 7/2010 | Chung et al. | | |
| 2014/0324892 A1* | 10/2014 | Tong | .................. | G06F 16/9535 707/754 |
| 2016/0269466 A1* | 9/2016 | Fan | .................. | H04L 67/02 |

FOREIGN PATENT DOCUMENTS

| | | |
|---|---|---|
| CN | 104317570 A | 1/2015 |
| CN | 104462583 A | 3/2015 |
| CN | 106095869 A | 11/2016 |

* cited by examiner

INFORMATION PROCESSING METHOD, TERMINAL, BACKGROUND SERVER AND SYSTEM, STORAGE MEDIUM

CROSS REFERENCING OF RELEVANT APPLICATIONS

This application is a continuation application of PCT Patent Application No. PCT/CN2017/085785, filed on May 24, 2017, which claims priority to Chinese Patent Application No. 201610393089.1 filed on Jun. 3, 2016, content of all of which is incorporated by reference in its entirety.

FIELD OF TECHNOLOGY

The present disclosure relates to a webpage information processing technology in the field of information communications technology and, more particularly, to a wide information processing method, a terminal, a background server and a system, and a storage medium.

BACKGROUND

Today, a user can browse webpages whenever and wherever possible by using a terminal, such as an intelligent mobile phone. However, due to the limited screen size of an intelligent mobile phone, webpage advertisements, that is, advertisements such as button advertisement, banner advertisement, pop-up window advertisement, floating advertisement, and interstitial advertisement in webpages, not only affect information display, but also consume network flow of the user.

Existing advertisement filtering solutions for webpage advertisements are mostly based on AdBlock, and the filtering ability of the technical solution of AdBlock can be attributed to two technologies: network interception and element hiding. 1) The network interception means analyzing features of a Uniform Resource Locator (URL) that is determined as an advertisement, making definition using a rule (similar to regular matching), intercepting a network request that meets the rule, that is, intercepting a network request for generating an advertisement element in a webpage, and blocking the advertisement from a source. As a result, a terminal cannot obtain relevant advertisement resources and certainly cannot display any advertisement. This approach is especially effective for intercepting advertisements of advertisement alliances, such as Baidu alliance, Taobao alliance, and Jusha. 2) Regarding the element hiding, when interception is not feasible, advertisement elements must be processed, any two elements in a Document Object Model (DOM) tree structure of a webpage always have some difference in some features, and these features that can be used for distinguishing themselves are all currently marked with Cascading Style Sheets (CSS) grammar, and these elements can be filtered if the attributes thereof are set to be hidden, that is, advertisement elements appearing in a webpage rendering process are hidden.

With escalation of anti-advertisement-filtering technologies, webpage developers intentionally blur and randomize features of advertisement elements and continuously reduce their locatability. These features are called random features, and the advertisement elements tend to have weakened features and cannot be located easily. These advertisements with random features can neither be intercepted from sources by simple URL interception, nor be located by CSS grammar. More specifically, the interception technology in advertisement filtering is usually an optimal preferred method, intercepts advertisements from sources, has better performance, and saves network flow. However, if advertisement elements are directly embedded into main sources, or sub-sources for generating advertisements not only are used to generate advertisements but also have some normal page functions, the interception method does not work. If the CSS rule is selected, random features cannot be processed easily either. Such problems mostly occur in mobile terminals, especially Android Package (APK) promotion links in webpages. Therefore, the existing network interception and element hiding technologies cannot filter the advertisement information with random features in webpages effectively.

JavaScript (JS) has high privilege and capability and can locate advertisement for filtering. However, compared with the CSS rule, writing and implementation of JS are too complicated, and the longer content of JS also consumes more network flow of a user for obtaining JS. As a result, the existing technology consumes more network flow of a user and has poor advertisement filtering performance.

The disclosed methods and systems are directed to solve one or more problems set forth above and other problems.

SUMMARY

In view of this, the embodiments of the present invention provide an information processing method, a terminal, a background server and a system, and a storage medium, and can filter multimedia information such as advertisement information efficiently, save network flow of a user, and enhance advertisement filtering performance.

One aspect of the present disclosure includes an information processing method. The method includes acquiring a JavaScript (JS) template for filtering multimedia information from a backend server when determining a preset update condition is satisfied; and acquiring a filtering parameter corresponding to a target webpage from the backend server when detecting that a user requests to access the target webpage. The method also includes inserting the filtering parameter into the JS template; executing the JS template inserted with the filtering parameter, screening out multimedia information from webpage information displayed on the target webpage and shielding displaying of the multimedia information Another aspect of the present disclosure includes an information processing method. The method includes sending a JavaScript (JS) template to a terminal in response to a request of acquiring the JS template for filtering multimedia information from a backend server when the terminal determines a preset update condition is satisfied. The method also includes searching a preset correspondence relationship of webpage identifiers and filtering parameters for a filtering parameter corresponding to a target webpage according to a webpage identifier of the target webpage in response to a request of acquiring the filtering parameter corresponding to the target webpage from the backend server when the terminal detects a user requests to access the target webpage. Further, the method includes sending the filtering parameter corresponding to the target webpage to the terminal.

Another aspect of the present disclosure includes an information processing system. The system includes a terminal; and a backend server. The terminal is configured to acquire a JavaScript (JS) template for filtering multimedia information from the backend server when determining a preset update condition is satisfied; acquire a filtering parameter corresponding to a target webpage from the backend server when detecting that a user requests to access the target webpage; insert the filtering parameter into the JS template, execute a JS template inserted with the filtering parameter, screen out multimedia information from webpage information displayed on the target webpage, and shield displaying of the multimedia information. The back-end server is configured to send to the terminal the JS template in response to a request for acquiring the JS template for filtering multimedia information; search a preset correspondence relationship between a webpage identifier of the target webpage and the filtering parameter corresponding to a target webpage; and send the filtering parameter corresponding to the target webpage to the terminal.

Other aspects of the present disclosure can be understood by those skilled in the art in light of the description, the claims, and the drawings of the present disclosure.

DETAILED DESCRIPTION

Figure 1:
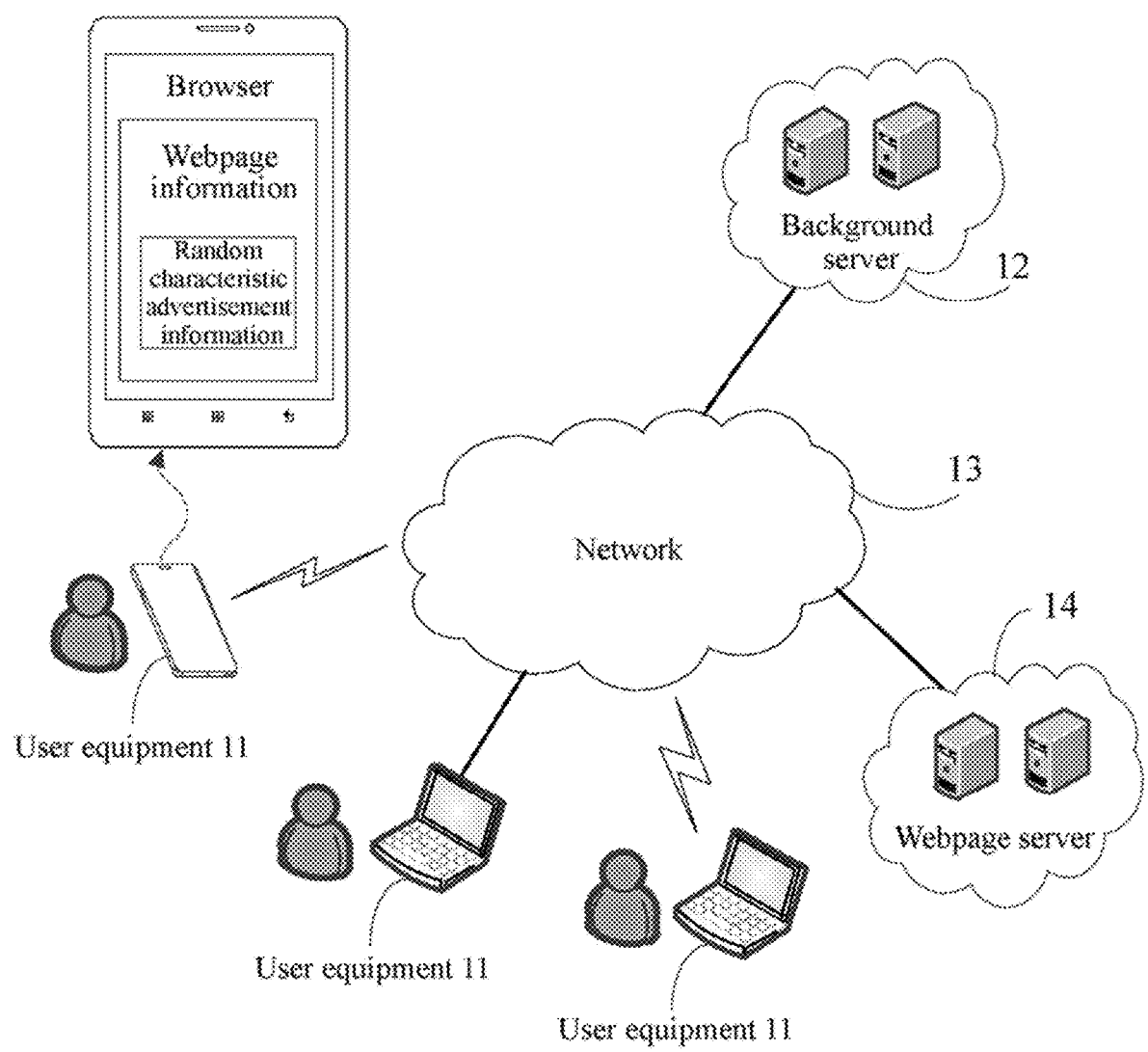
FIG. 1 is a schematic view of an application scene of an information processing method according to one embodiment of the present disclosure.

Under the existing advertisement filtering technology: 1) existing network interception and element hiding technologies cannot filter random-feature advertisement information in a webpage effectively; 2) JS has higher privilege and capability and, in theory, JS can locate any element in a webpage and perform any operation on any element in a webpage, including filtering random-feature advertisement information. However, compared with the network interception and element hiding technologies, the process of writing and implementation of JS is too complicated, and the longer content of JS also consumes more network flow for obtaining JS by a user. Furthermore, direct exposure of a JS interface will bring unexpected and serious hidden risk, for example, a risk of the JS interface being maliciously used. As a result, the existing JS technology consumes more network flow of a user, and has poor security and low advertisement filtering performance.

The present disclosure will be further described in detail with reference to the accompanying drawings. It should be understood that, the embodiments described herein are only used to describe the technical solutions of the present disclosure, and are not used to limit the protection scope of the present disclosure. In addition, the following embodiments are used to implement a part of the embodiments of the present disclosure, but are not all the embodiments for implementing the present disclosure. The embodiments obtained by recombining the technical solutions in the following embodiments and other embodiments implemented on the basis of the present disclosure without creative efforts all fall in the protection scope of the present disclosure.

It should be noted that, in the embodiments of the present disclosure, the terms "include", "comprise", and any variants thereof are intended to cover a non-exclusive inclusion. Therefore, in the context of a method or a device that includes a series of elements, the method or device not only includes such elements, but also includes other elements not specified expressly, or may include inherent elements of the implementation method or device. Unless otherwise specified, an element limited by "include a/an . . . " does not exclude other same elements existing in the method or the device that includes the element (for example, steps in a method or units in a device). For example, the information processing method provided in the embodiments of the present disclosure provides a series of steps. However, the information processing method provided in the embodiments of the present disclosure is not limited to the disclosed steps. Likewise, the terminal provided in the embodiments of the present disclosure includes a series of modules, but the terminal provided in the embodiments of the present disclosure is not limited to include the modules that are explicitly disclosed, and may further include modules/units that need to be set for acquiring relevant information or performing processing on the basis of information.

It should be noted that, the terminal in the embodiments of the present disclosure may be a device such as an intelligent mobile phone, a tablet computer, a desktop computer, a notebook computer, and a wearable device (for example, an intelligent watch) that can process and display multimedia information (for example, supporting a browser and an audio and video playing application).

The technical solutions disclosed in the embodiments of the present disclosure can be used for realizing filtering of advertisement information in a webpage, especially for realizing filtering of random-feature advertisement information in a webpage that cannot be filtered by the existing technology. Referring to an example of an application scene of an information processing method in one embodiment of the present disclosure shown in FIG. 1, the application scene in FIG. 1 includes a terminal (user equipment) 11 installed with a browser client, a webpage server 14, and a background server 12 of a browser, and the terminal 11, the background server 12, and the webpage server 14 perform data interaction through a network 13.

The terminal 11 installed with a browser client may be a device such as an intelligent mobile phone, a tablet computer, a desktop computer, a notebook computer, a wearable device (for example, an intelligent watch) on which a browser can run. A user accesses a webpage through the browser client of the terminal 11, the browser client sends a Hyper Text Transfer Protocol (HTTP) request to a webpage server 14 corresponding to a webpage. After analyzing the request, the webpage server 14 feeds back webpage resources including advertisement information to the browser client. When the browser client performs rendering display, advertisement information (including the random-feature advertisement information) appears in the webpage information of the webpage, the advertisement information not only affects information display, but also consumes the network flow of a user, and the advertisement information needs to be filtered in time.

It should be noted that, the application scene in FIG. 1 is only an example of one possible application scene of the technical solution disclosed in one embodiment of the present disclosure. Other application scenes may include a terminal that is not shown in FIG. 1 or an application (such as an audio and video playing application) installed on the terminal for processing and displaying multimedia information. The technical solution disclosed in the embodiments of the present disclosure can be applied in the aforementioned scene so as to overcome the disadvantages that the existing advertisement filtering technology on the basis of network interception or element hiding cannot filter random-feature advertisement information, in a webpage effectively and the existing JS technology consumes more network flow of a user and has poor advertisement filtering performance.

On the basis of the application scene disclosed above, various embodiments are described below.

One embodiment provides an information processing method that can be used to realize filtering of advertisement information including random-feature advertisement information in a webpage, so as to overcome the disadvantages in the existing advertisement filtering technology.

Figure 2:
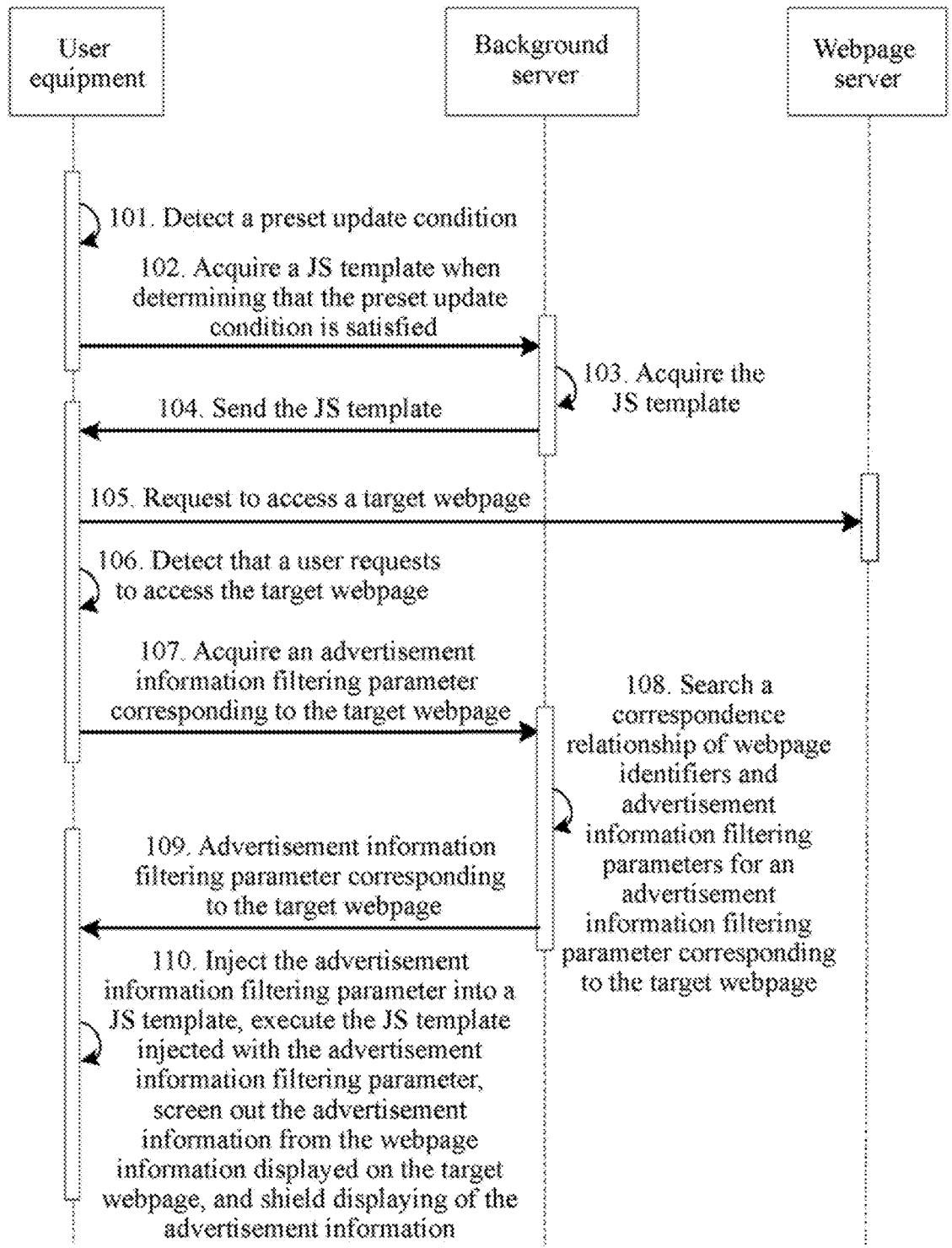
FIG. 2 is a flowchart of an information processing method according to one embodiment of the present disclosure.

Referring to FIG. 2, the information processing method disclosed in one embodiment can be implemented by a terminal and a background server of a browser in cooperation. In one embodiment, multimedia information is taken as an example of advertisement information for description, and the method includes the following steps.

Step 101: The terminal detects whether a preset update condition is satisfied. If the preset update condition is satisfied, step 102 is performed, and otherwise, detection is continued. The detection may be a continuous detection or a periodic detection.

Step 102: The terminal acquires a JS template for filtering advertisement information from a backend server when determining that a preset update condition is satisfied.

Specifically, the terminal can send an acquisition request to the backend server when determining that the preset update condition is satisfied, so that the backend server sends back the JS template for filtering advertisement information to the terminal.

In one embodiment, the preset update condition may be: 1) periodic update, for example, the terminal using a low-frequency (for example, once every 24 fours) update mode to acquire a JS template for filtering advertisement information from a backend server, or 2) event update, if judging that the currently stored JS template is abnormal (for example, is tampered, incomplete, and invalid), the terminal using a real-time update command to acquire a JS template for filtering advertisement information from the backend server. Further, if the backend server suffers a sudden problem, the backend server sends the latest version of JS template to the terminal. In other embodiments of the present disclosure, the terminal can acquire and store the JS template in advance, and acquire an updated JS template from the backend server when determining that the preset update condition is satisfied.

The existing JS technology needs to write different JS for different webpages, the workload is heavy, and the implementation complexity is high. In one embodiment, the JS corresponding to the target webpage is divided into a JS template corresponding to a plurality of different webpages and a filtering parameter corresponding to a target webpage. The JS template has certain uniformity, and one JS template may correspond to a plurality of different webpages. The JS template is larger and has a lower variation frequency compared with the filtering parameter. Meanwhile, the writing of the JS template is relatively complicated, but the determination of the filtering parameter is relatively simple, when JS corresponding to different webpages is written, the JS template does not need to be written again, a uniform JS template is used, only the filtering parameter corresponding to the webpage needs to be determined separately, thereby reducing the workload of writing JS significantly and reducing the implementation complexity.

It should be noted that, a filtering parameter corresponding to the target webpage may refer to one series or one group of parameters (for example, more than 1), and a filtering parameter corresponding to the target webpage may also be called as an advertisement information filtering rule corresponding to the target webpage.

Step 103: The backend server acquires a JS template, for example, from a database of the backend server.

Step 104: The backend server sends the JS template to the terminal.

In one embodiment, the terminal can set an update timer and starts it. When the terminal determines the update timer exceeds a threshold, the terminal sends a JS template update request message to the backend server.

The backend server judges whether to update the JS template according to the JS template update request message. When determining to update the JS template, the backend server acquires an updated JS template. The backend server sends a JS template response message carrying the updated JS template to the terminal.

Step 105: The user requests to access the target webpage.

Step 106: The terminal detects that a user requests to access the target webpage.

Step 107: The terminal acquires a filtering parameter corresponding to the target webpage from the backend server.

A user performs network access through a terminal in two modes, that is, direct connection and transparent proxy (called "proxy" for short). The direct connection is to directly send a network request to a third-party web site (such as a webpage server) directly. The transparent proxy is to send a network request to a backend server, the backend server receives and transmits the network request and performs certain processing, for example, advertisement filtering, picture compression, and security detection. If the direct connection mode is used, when the terminal detects that a user sends a webpage access request to a server of a target webpage, the terminal requests for a filtering parameter corresponding to the target webpage from the backend server synchronically, that is, the terminal needs to send a parameter acquisition request to the backend server separately. If the transparent proxy mode is used, when the terminal detects that a user sends a webpage access request to a server of a target webpage, the terminal forwards the network access request to the backend server, so as to instruct the backend server to send back a filtering parameter corresponding to the target webpage.

Further, the terminal can acquire and store a filtering parameter corresponding to the target webpage in real time (for example, set an effective buffer period).

When the terminal detects a user requests to access a target webpage, whether the terminal stores a filtering parameter corresponding to the target webpage is determined. If the terminal stores a filtering parameter corresponding to a target webpage, the terminal sends a parameter update request message indicating that the terminal stores a filtering parameter corresponding to the target webpage to the backend server. The backend server judges whether the filtering parameter needs to be updated according to parameter update request message, and acquires an updated filtering parameter when determining to update the filtering parameter. The backend server sends a parameter update response message carrying the updated filtering parameter to the terminal. The terminal updates a filtering parameter corresponding to the target webpage according to the parameter update response message. Otherwise, the terminal acquires a filtering parameter corresponding to the target webpage from the backend server.

Further, when the terminal stores a filtering parameter corresponding to a target webpage, for example, when a terminal accesses the same webpage for the $(N+1)_{th}$ time in a certain period of time, the terminal may possibly store a filtering parameter corresponding to the webpage, and the terminal only needs to determine whether the filtering parameter is changed from a backend server. If no update is needed, the terminal directly uses the stored filtering parameter corresponding to the webpage, and does not need to acquire the filtering parameter from the backend server again, thereby reducing consumption of a flow of a user. It should be noted that, a filtering parameter can be stored in a terminal in the following manners: 1) being encrypted high-reliably and then stored, or 2) being stored in a memory. In other embodiments of the present disclosure, an effective storage period for a filtering parameter can be set, and when the effective storage period expires, a terminal needs to acquire a new filtering parameter from a backend server again.

Step 108: The backend server, according to a webpage identifier of the target webpage, searches a preset correspondence relationship of webpage identifiers and filtering parameters for a filtering parameter corresponding to the target webpage.

The preset correspondence relationship of webpage identifiers and filtering parameters is used to provide a filtering parameter corresponding to webpage identifiers of different webpages, and each webpage has a group of filtering parameters corresponding to its own webpage identifier.

Step 109: The backend server sends the filtering parameter to the target webpage to the terminal.

Step 110: The terminal injects the filtering parameter into a JS template, executes the JS template injected with the filtering parameter, screens out the advertisement information from the webpage information displayed on the target webpage, and shielding displaying of the advertisement information.

When the advertisement information includes random-feature advertisement information, the terminal uses the injected JS template to locate the advertisement information in the webpage information displayed on the target webpage, screens out the advertisement information including the random-feature advertisement information from the webpage information displayed on the target webpage, and shields displaying of the advertisement information. In other embodiments of the present disclosure, the webpage information displayed on the target webpage may be webpage information displayed after the target webpage has been rendered, or the webpage information displayed on a browser during a rendering process of the target webpage. It should be noted that, the time for the terminal to execute the JS template injected with the filtering parameter may be after the rendering of the target webpage or during a page rendering process.

Figure 3:
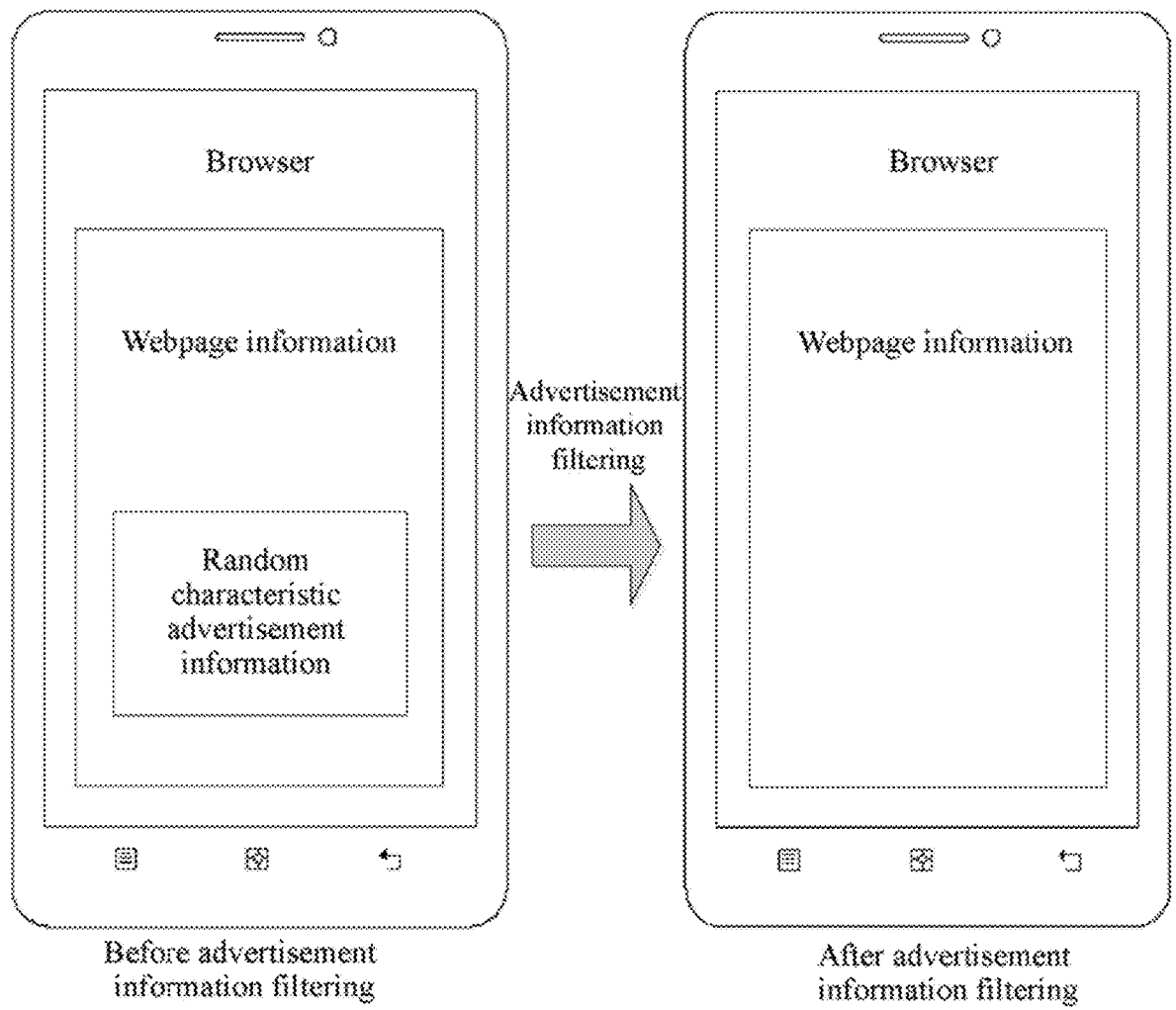
FIG. 3 is a schematic view of implementing information processing on the basis of FIG. 1 according to one embodiment of the present disclosure.

An example of the information processing method disclosed in one embodiment is described with reference to the application scene shown in FIG. 1. Referring to a schematic view of implementing information processing on the basis of an application scene in FIG. 1 in one embodiment of the present disclosure, as shown in FIG. 3, when a browser client of a terminal performs rendering and displaying, advertisement information (including random-feature advertisement information) appears in the webpage information of a webpage. Referring to a display condition of the webpage information before filtering of the advertisement information shown in the left side area in FIG. 3, the advertisement information not only affects information display, but consumes network flow of a user. The information processing method disclosed in one embodiment is used to perform effective filtering on the advertisement information including random-feature advertisement information included in the target webpage. Referring to a display condition of the webpage information after filtering of the advertisement information shown in the right side area in FIG. 3, the advertisement information including the random-feature advertisement information has been shielded (filtered). It should be noted that, herein, the terminal is described by taking an intelligent mobile phone as an example, and the solution of one embodiment is applicable to any device that can run a browser, such as an intelligent mobile phone installed with a browser client, a tablet computer, a desktop computer, a notebook computer, and a wearable device (for example, an intelligent watch).

Accordingly, since JS corresponding to a target webpage is divided into a JS template corresponding to a plurality of different webpages and a filtering parameter corresponding to a target webpage, a terminal obtains the JS template and the filtering parameter in separated processes. Since a JS template is larger and has a lower variation frequency compared with filtering parameters, low-frequency update is used for a JS template, and real-time update is used for a filtering parameter, thereby reducing network flow consumed for acquiring JS many times by a user. Meanwhile, one embodiment uses JS with high privilege and capability, and can locate random-feature advertisement information in a target webpage. In this way, the present disclosure can effectively filter advertisement information including the random-feature advertisement information, save the network flow of a user, and enhance advertisement filtering performance.

Besides the disadvantages of consuming more flow of a user and having low advertisement filtering performance in the existing technology, direct exposure of a JS interface in the existing technology will bring unexpected and serious hidden risk, for example, a risk of the JS interface being maliciously used. As a result, the existing JS technology has the disadvantage of poor security. Thus, one embodiment provides a solution for the disadvantage of poor security in the existing JS technology.

Figure 4:
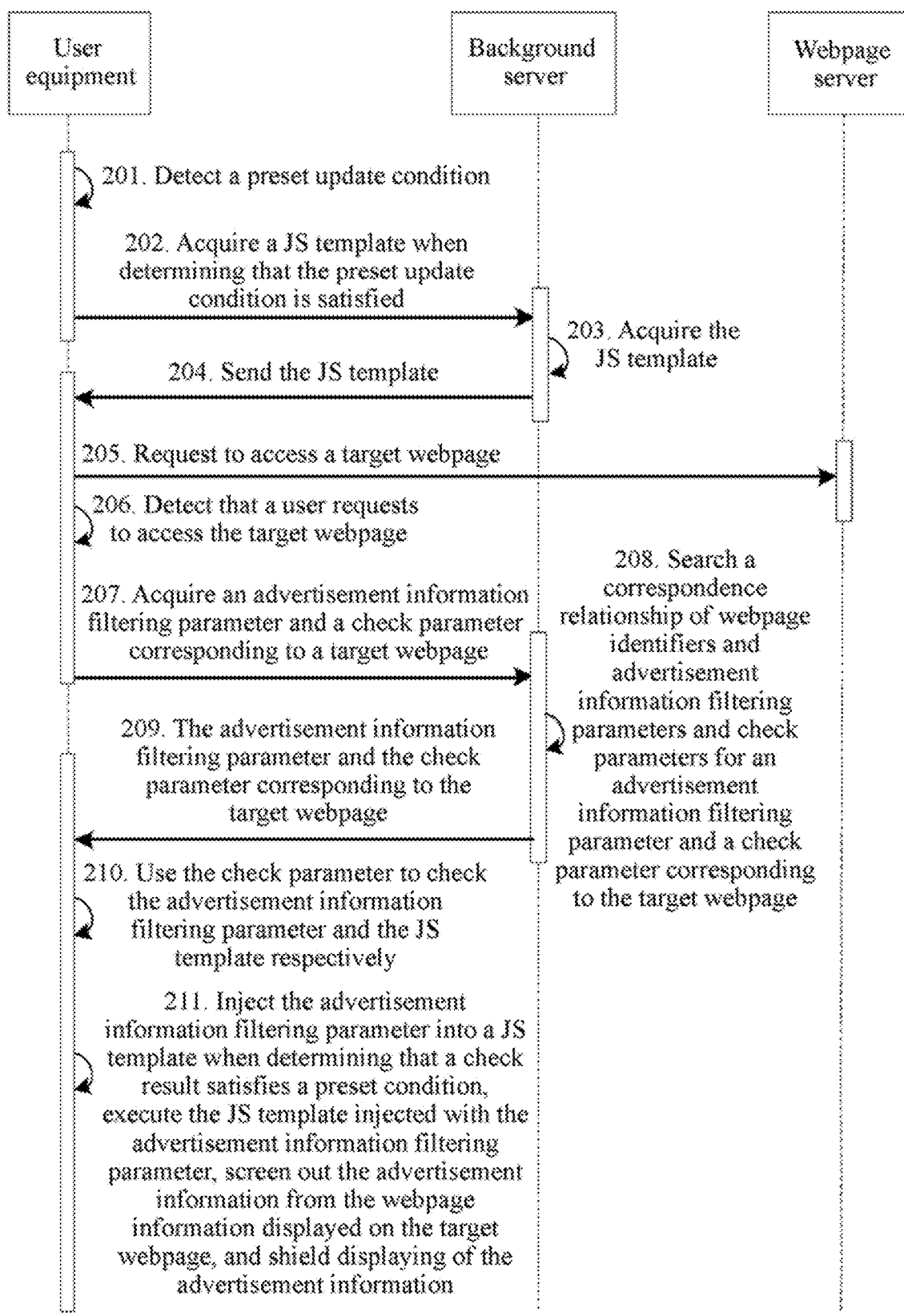
FIG. 4 is another flowchart of an information processing method according to one embodiment of the present disclosure.

Referring to FIG. 4, the information processing method disclosed in one embodiment can be implemented by a terminal and a backend server of a browser in cooperation. The method includes the following steps.

Step 201: The terminal detects whether a preset update condition is satisfied. If the preset update condition is satisfied, step 202 is performed, and otherwise, the detection is continued. Herein, the detection may be a continuous detection or a periodic detection.

Step 202: The terminal acquires a JS template for filtering advertisement information from a backend server when determining that the preset update condition is satisfied.

Step 203: The backend server acquires the JS template, for example, from a database of the backend server.

Step 204: The backend server sends the JS template to the terminal.

Step 205: The user requests to access the target webpage.

Step 206: The terminal detects that the user requests to access the target webpage.

Step 207: The terminal acquires a filtering parameter and a check parameter corresponding to the target webpage from the backend server.

In one embodiment, one webpage can correspond to one set of check parameters, the check parameters may be, for example, a value MD5. In other embodiments of the present disclosure, the terminal sends a parameter request message carrying the webpage identifier of the target webpage to the backend server.

Step 208: In response to a request of the terminal for acquiring a filtering parameter and a check parameter corresponding to the target webpage from the backend server, the backend server searches a preset correspondence relationship between webpage identifiers and filtering parameters and check parameters for the filtering parameter and check parameter corresponding to the target webpage according to the webpage identifier of the target webpage.

Step 209: The backend server sends the filtering parameter and the check parameter of the target webpage to the terminal.

In other embodiments of the present disclosure, after searching for the filtering parameter and the check parameter corresponding to the target webpage, the backend server uses a preset key to encrypt the filtering parameter and the check parameter corresponding to the target webpage, and acquires the encrypted filtering parameter and check parameter; and sends the encrypted filtering parameter and check parameter corresponding to the target webpage to the terminal.

It should be noted that, the process of implementing encryption and decryption may take some processing time of the backend server and the terminal, but the process will also enhance the security of parameter transmission and processing.

Step 210: The terminal uses the check parameter to check the filtering parameter and JS template respectively to obtain a check result.

If the terminal judges the backend server sends the encrypted filtering parameter and check parameter, the terminal uses a preset key to decrypt the encrypted filtering parameter, thereby acquiring the filtering parameter corresponding to the target webpage.

The process for the terminal to use the check parameter to check the filtering parameter has no correlation with the process for the terminal to use the check parameter to respectively check the JS template in terms of time for performance, and the two processes can be performed in sequence or at the same time. Correspondingly, the two processes respectively correspond to respective check results. For convenience in understanding, herein, the process for the terminal to use the check parameter to check the filtering parameter is called as a first check process, a check result of the filtering parameter is called as a first check result. The process for the terminal to use the check parameter to check the JS template is called as a second check process, and a check result of the JS template is called as a second check result. It can be understood that the check result in step 206 includes the first check result and the second check result.

A feasible implementation process for the terminal to judge whether the check result satisfies a preset condition includes the following steps.

The terminal judges whether the first check result satisfies a first preset condition, the first preset condition may include a first preset check value; and the terminal judges whether the second check result satisfies a second preset condition, and the second preset condition may include a second preset check value.

Only when the terminal judges that the first check result satisfies the first preset condition and the second check result satisfies the second preset condition, the terminal determines the check result satisfies the preset condition, and step 207 is performed.

Otherwise, if the terminal judges that the first check result does not satisfy the first preset condition, that is, the check result reflects that the filtering parameter corresponding to the target webpage is abnormal (for example, is tampered and incomplete), the terminal acquires a filtering parameter corresponding to the target webpage from the backend server; if the terminal judges that the second check result does not satisfy the second preset condition, that is, the check result reflects that the JS template corresponding to the target webpage is abnormal (for example, is tampered, incomplete, and invalid), the terminal acquires the JS template from the backend server.

Step 211: When determining that the check result satisfies the preset condition, the terminal injects the filtering parameter into the JS template, executes the JS template injected with the filtering parameter, screens out the advertisement information from the webpage information displayed on the target webpage, and shield displaying of the advertisement information.

In one embodiment, a check parameter is used to perform accuracy check on the JS template and the filtering parameter, so as to ensure security of a JS interface (legality and completeness), and avoid a security risk for directly exposing a JS interface due to the high privilege of the JS interface. As such, under the condition of ensuring security, the advertisement information including the random-feature advertisement information is filtered effectively, so as to save network flow of a user, enhance advertisement filtering performance, and overcome the disadvantages that the existing advertisement filtering technology on the basis of network interception or element hiding cannot filter random-feature advertisement information effectively, and overcome the disadvantage that the existing JS technology consumes more network flow of a user and has poor security and poor advertisement filtering performance.

One embodiment describes the implementation process of the information processing method from a product aspect and a technology aspect respectively on the basis of any of the above-described embodiments.

Figure 5:
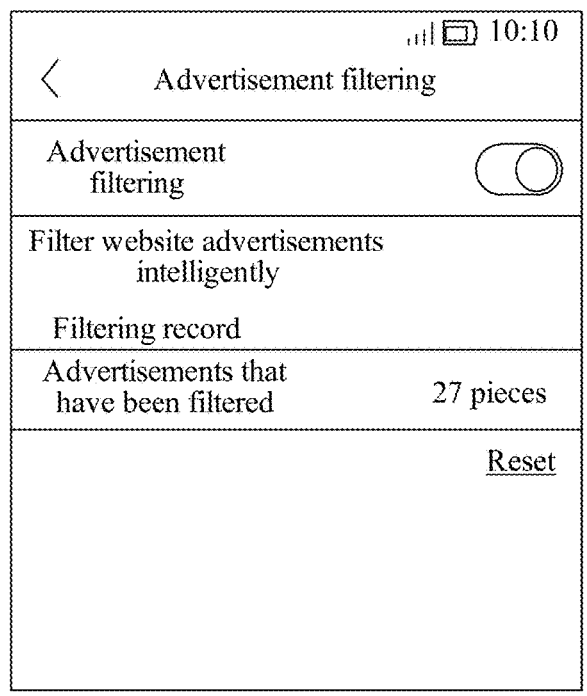
FIG. 5 is a schematic view of implementation of an advertisement filtering function switch according to one embodiment of the present disclosure.

1. Description of the Product Aspect:

Advertisement filtering is a basic function of a browser, can even dominate the public opinion of a browser sometimes, and is an important part of user experience. In one embodiment, unlike some browsing service products, where the starting/closing privilege of the advertisement filtering function is controlled by the backend server, the disclosed browser can support a user to set whether to start the advertisement filtering function. Referring to FIG. 5, a user only needs to select to start the advertisement filtering function. That is, the starting/closing privilege of the advertisement filtering function is set by a client/user.

2. Description of the Technology Aspect:

One embodiment provides a parameter filling solution on the basis of a JS template, and the implementation process at the technology side includes: template update, delivery of the JS parameter (including the filtering parameter) rule, and data storage on a terminal (that is, the terminal described above).

1) Update and Acquisition of a JS Template

Figure 6:
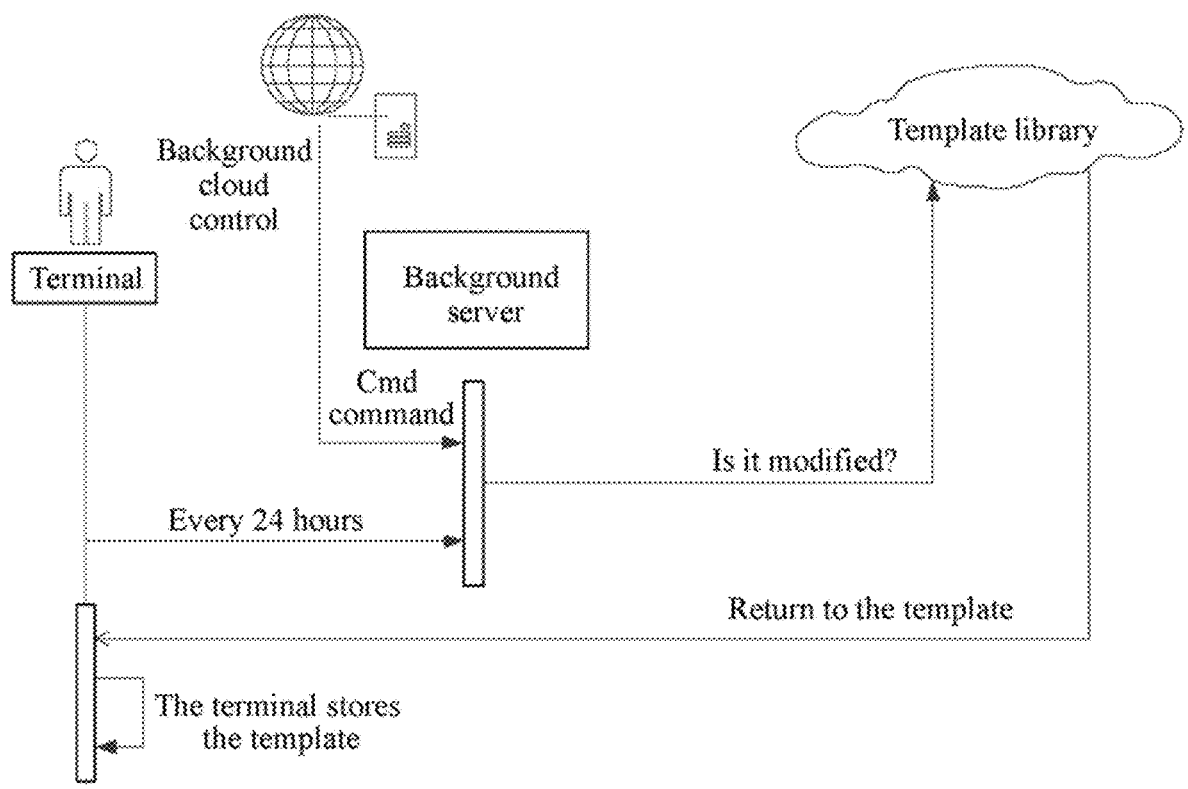
FIG. 6 is a schematic view of acquiring a JS template according to one embodiment of the present disclosure.

Because the file of a JS template is relatively large, at the beginning of the design, the uniformity is taken into consideration and passes certain tests, so the variation frequency is relatively low. Referring to FIG. 6, in one embodiment, it is assumed that the update frequency is 24 hours. In order to update the template immediately when a problem occurs, a real-time update command (Cmd) is also provided.

2) Delivery of JS Parameter Rules

A terminal can access a network in two modes, that is, direct connection and transparent proxy (called "proxy" for short). The direct connection is to directly send a request to a third-party site. The transparent proxy is to send a request to a backend, the backend receives and transmits the network request and performs certain processing, for example, advertisement filtering, picture compression, and security detection. If the direct connection request is used, when a user accesses a third-party site, an advertisement filtering request is sent to the backend synchronically. If the transparent proxy is used, the rule is directly carried in a response header. After the terminal decrypts to acquire the rule parameter, the terminal injects the rule parameter into the JS template, and executes the JS at the end of page rendering.

Figure 7:
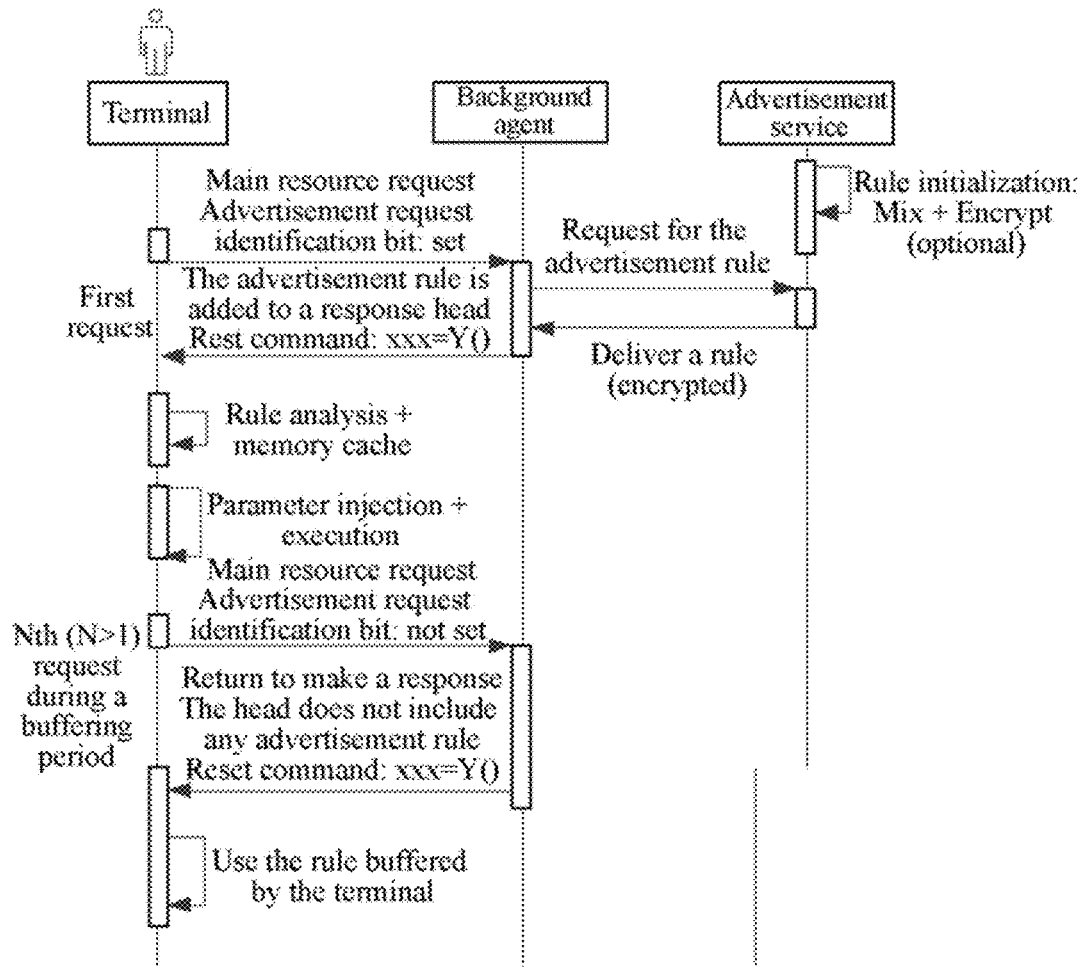
FIG. 7 is a schematic view of acquiring a filtering parameter according to one embodiment of the present disclosure.

The transparent proxy mode is used as an example to describe the process flow shown in FIG. 7. FIG. 7 is described in a form of a sequence diagram.

A. Initialization of Advertisement Rules:

Each rule represents a series of parameters. It is assumed that the rule is X, and the corresponding MD5 is Y. Firstly, according to a certain rule, X and Y are scrambled and then arranged to obtain Z, that is Z=f(X, Y), and then, Z is mapped to obtain Z'=g(X). The purpose for scrambling and rearranging is to increase the difficulty in identification, and then, the rule is encrypted uniformly.

B. Main Resource Request:

The terminal will carry a request identifier when requesting, if an advertisement request identification bit is set, it represents that the terminal has no buffer rule, and the backend server may deliver a rule to the terminal; and if the advertisement request identification bit is not set, it represents that the terminal has a buffer rule, and the backend server does not allow to deliver any rule.

C. Response to a Main Resource Request:

Two levels of security strategies are defined, that is, whether to encrypt the returned rule again. The encryption may be performed by a DES Key of more than 1024 bits generated by a public key corresponding to a private key written into terminal codes. In consideration that the time performance of the backend and the terminal is greatly influenced after encryption and decryption, the encryption strategy is optional.

Secondly, the backend server carries a mark xxx in a response header sent to the terminal, which can instruct the terminal to delete an existing wrong rule if the wrong rule has been delivered to the terminal before.

D. Rule Analysis and Parameter Insertion:

The terminal decrypts a rule upon receiving it. After decryption, the terminal firstly acquires MD5 and uses MD5 to check whether the template buffered by the terminal is tampered maliciously. Then, the MD5 value is separately checked for each rule. Finally, the correctly analyzed rule is inserted to the JS template to be performed.

E. Nth (N>1) Network Request:

In a buffer valid period, for repeated access to a same site, the terminal reuses the buffered rule instead of requesting or receiving a new rule.

3) Storage of JS Template and the Parameter at the Terminal

The JS template can be stored in a system file in the form of a file. The completeness and validity of the JS template are checked through the template MD5 parameter in the rule of the backend. Therefore, even replacement of the template may bring no security problem.

Secondly, since a rule can be used for checking a template, the rule either is stored after high-reliable encryption, or is only stored in a memory.

One embodiment provides a secure parameter-filling solution based on the JS template. The JS is divided into a JS template corresponding to a plurality of different webpages and a filtering parameter corresponding to the target webpage, the acquisition and storage of the JS template and parameter rule are performed separately, so as to realize the filtering of advertisement information including random-feature advertisement information. In consideration the features that a JS template has a low variation frequency and consumes more flow, the solution uses a low-frequency (for example, every 24 hours) query mode to acquire the information of the template and store the information at the terminal, and the communications process uses a WUP encryption mode. The advertisement rule is requested from the backend at the same time when a user opens a webpage, the backend delivers encrypted template parameters and template check MD5 value, and the MD5 value can be used to tamper resistant check of a terminal template. Therefore, the above process does not bring significant influence on terminal performance, consumes less flow of a user, avoids an unexpected risk possibly brought by a fact that a JS interface is directly exposed and any JS interface can be performed, and enhances advertisement filtering effects.

Corresponding to the disclosed method embodiments, one embodiment further discloses an information processing system that includes a terminal and a backend server.

The terminal is configured to acquire a JS template for filtering advertisement information from a backend server when determining a preset update condition is satisfied; acquire a filtering parameter corresponding to the target webpage from the backend server when detecting that a user requests to access a target webpage; insert the filtering parameter into the JS template, execute the JS template inserted with the filtering parameter, screen out advertisement information from webpage information displayed on the target webpage, and shielding displaying of the advertisement information.

The backend server is configured to send a JS template to a terminal in response to a request for acquiring the JS template for filtering advertisement information from a backend server 32 when the terminal determines a preset update condition is satisfied; search a preset correspondence relationship of webpage identifiers and filtering parameters for a filtering parameter corresponding to the target webpage according to a webpage identifier of the target webpage in response to a request for acquiring a filtering parameter corresponding to the target webpage from the backend server when the terminal detects that a user requests to access the target webpage; send a filtering parameter corresponding to the target webpage to the terminal.

In one embodiment, since JS corresponding to a target webpage is divided into a JS template corresponding to a plurality of different webpages and a filtering parameter corresponding to the target webpage, a terminal acquires the JS template and the filtering parameter in separated processes. Since a JS template is larger and has a lower variation frequency compared with filtering parameter, low-frequency update is used for a JS template, and real-time update is used for a filtering parameter, thereby reducing network flow consumed for acquiring JS many times by a user. Meanwhile, one embodiment uses JS with high privilege and capability, and can locate random-feature advertisement information in a target webpage. In this way, the present disclosure can effectively filter advertisement information including the random-feature advertisement information, saves the network flow of a user, and enhance advertisement filtering performance.

On the basis of the aforementioned embodiment, the terminal is further configured to acquire a check parameter corresponding to a target webpage from a backend server when detecting that a user requests to access the target webpage; use a check parameter to check a filtering parameter and a JS template respectively; and insert the filtering parameter into a JS template when determining that a check result satisfies a preset condition.

On the basis of the aforementioned embodiment, the terminal is configured to send a JS template update request message to the backend server when determining an update timer exceeds a threshold. Accordingly, the backend server is configured to judge whether to update the JS template according to the JS template update request message; acquire an updated JS template when determining to update the JS template; and send a JS template response message carrying the updated JS template to the terminal.

Further, the terminal may also be configured to send a parameter update request message indicating that the terminal stores a filtering parameter corresponding to the target webpage to the backend server when detecting that a user requests to access the target webpage and judging the terminal stores the filtering parameter corresponding to the target webpage;

The backend server is further configured to judge whether to update the filtering parameter according to the parameter update request message; acquire an updated filtering parameter when determining to update the filtering parameter; and send a parameter update response message carrying the updated filtering parameter to the terminal.

The terminal is further configured to update the filtering parameter corresponding to the target webpage according to the parameter update response message.

Further, the backend server is configured to use a preset key to encrypt the filtering parameter corresponding to the target webpage, so as to obtain the encrypted filtering parameter, and send the encrypted filtering parameter corresponding to the target webpage to the terminal.

The terminal is configured to use a preset key to decrypt the encrypted filtering parameter sent by the backend server, so as to obtain the filtering parameter corresponding to the target webpage.

One embodiment discloses a terminal. The terminal may include a device such as an intelligent mobile phone, a fixed telephone, a tablet computer, a notebook computer, and a wearable device (such as intelligent glasses and watches).

Figure 8:
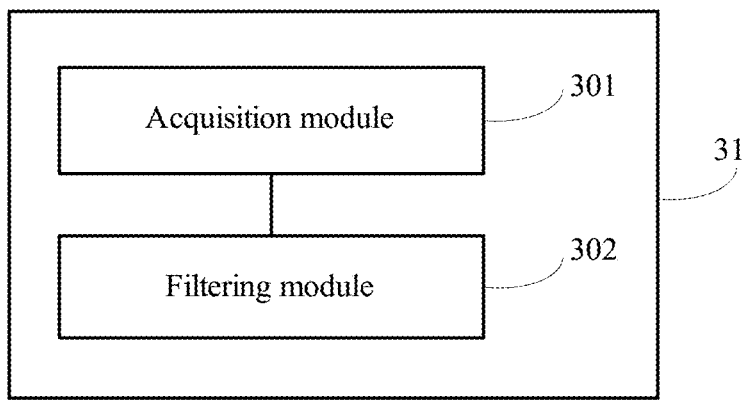
FIG. 8 is a schematic structural diagram of a terminal according to one embodiment of the present disclosure.

Referring to FIG. 8, the terminal (user equipment) 31 shown in FIG. 8 includes an acquisition module 301 and a filtering module 302.

The acquisition module 301 is configured to acquire a JS template for filtering advertisement information from a backend server when determining a preset update condition is satisfied. The acquisition module 301 is further configured to acquire a filtering parameter corresponding to the target webpage from the backend server when detecting that a user requests to access the target webpage.

The filtering module 302 is configured to insert the filtering parameter into the JS template; perform a JS template inserted with the filtering parameter, screen out advertisement information from webpage information displayed on the target webpage, and shield displaying of the multimedia information.

Further, the acquisition module 301 is further configured to acquire a check parameter corresponding to a target webpage from the backend server when detecting that a user requests to access a target webpage;

The filtering module 302 is further configured to use a check parameter to check the filtering parameter and the JS template and perform an operation of inserting the filtering parameter into a JS template when determining that the check result satisfies a preset condition.

Further, the acquisition module 301 is configured to request for a filtering parameter corresponding to the target webpage from the backend server when detecting a user sends a webpage access request to a server of a target webpage; or forward the webpage access request to the backend server when detecting the user sends the webpage access request to the server of the target webpage, so as to instruct the backend server to send back the filtering parameter corresponding to the target webpage.

Further, the filtering module 302 is configured to execute the JS template inserted with the filtering parameter, locate the random-feature advertisement information in the webpage information displayed on the target webpage, and shield displaying of the random-feature advertisement information on the target webpage.

Further, the acquisition module 301 is configured to send a JS template update request message to the backend server when determining that the update timer exceeds a threshold, so as to trigger the backend server to judge whether to update the JS template; receive a JS template update response message sent back by the backend server; and update the JS template according to the JS template update response message.

Further, the acquisition module 301 may be configured to judge whether the terminal stores a filtering parameter corresponding to the target webpage when detecting that a user requests to access the target webpage; send a parameter update request message indicating that a terminal stores the filtering parameter corresponding to the target webpage to the backend server if the terminal stores the filtering parameter corresponding to the target webpage, so as to trigger the backend server to judge whether to update the filtering parameter; receive the parameter update response message fed back by the backend server; update the filtering parameter corresponding to the target webpage according to the parameter update response message; and otherwise, perform a step of acquiring a filtering parameter corresponding to the target webpage from the backend server.

Further, the filtering module 302 is configured to use a check parameter to check the filtering parameter corresponding to the target webpage; use the check parameter to check the JS template that is corresponding to a plurality of different webpages and is used to filter the advertisement information.

Further, the acquisition module 301 is configured to send a message for requesting a filtering parameter corresponding to the target webpage to the backend server; receive a parameter response message fed back by the backend server; analyze the parameter response message to obtain the filtering parameter that is corresponding to the target webpage and is encrypted; use a preset key to decrypt the encrypted filtering parameter to obtain the filtering parameter corresponding to the target webpage.

In actual application, the acquisition module 301 and the filtering module 302 both can be implemented by a Central Processing Unit (CPU), a Microprocessor (MPU), an Application Specific Integrated Circuit (ASIC) or a Field Programmable Gate Array (FPGA) in a terminal.

Figure 9:
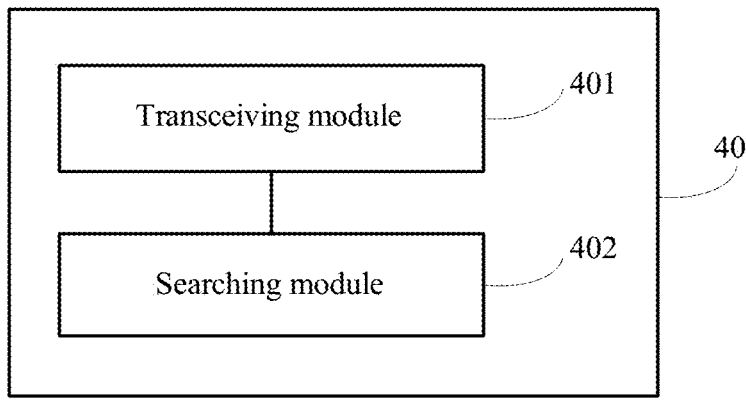
FIG. 9 is a schematic structural diagram of a background server according to one embodiment of the present disclosure.

One embodiment discloses a backend server. The backend server may include an applied backend server (for example, the backend server of a browser). Referring to FIG. 9, the backend server 41 shown in FIG. 9 includes a transceiving module 401 and a searching module 402.

The transceiving module 401 is configured to send a JS template to a terminal in response to a request for acquiring the JS template for filtering advertisement information from the backend server when the terminal determines a preset update condition is satisfied.

The searching module 402 is configured to search a preset correspondence relationship of webpage identifiers and filtering parameters for a filtering parameter corresponding to a target webpage according to a webpage identifier of the target webpage in response to a request for acquiring a filtering parameter corresponding to the target webpage from the backend server when the terminal detects that a user requests to access the target webpage.

The transceiving module 401 is further configured to send a filtering parameter corresponding to the target webpage to the terminal.

In other embodiments of the present disclosure, the transceiving module 401 is further configured to send a check parameter corresponding to the target webpage to the terminal in response to a request of the terminal for acquiring the check parameter corresponding to the target webpage from the backend server, and the check parameter is used to make the terminal use the check parameter to check the filtering parameter and the JS template respectively.

In other embodiments of the present disclosure, the transceiving module 401 is configured to: judge whether to update the JS template according to the JS template update request message in response to the JS template update request message sent by the terminal to the backend server when the terminal determines that the update timer exceeds a threshold; to acquire an updated JS template when determining to update the JS template; and to send the JS template update response message carrying the updated JS template to the terminal.

In other embodiments of the present disclosure, the transceiving module 401 is further configured to receive a parameter update request message sent by the terminal and used for instructing that the terminal stores the filtering parameter corresponding to the target webpage; judge whether to update the filtering parameter according to the parameter update request message; determine to update the filtering parameter and acquire the updated filtering parameter; and send the parameter update response message carrying the updated filtering parameter to the terminal.

In other embodiments of the present disclosure, the transceiving module 401 is configured to use the preset key to encrypt the filtering parameter corresponding to the target webpage and obtain the encrypted filtering parameter; and send the filtering parameter that is corresponding to the target webpage and is encrypted to the terminal.

In actual application, the transceiving module 401 and the searching module 402 both can be realized by the CPU, the MPU, the ASIC or FPGA located on the backend server.

Figure 10:
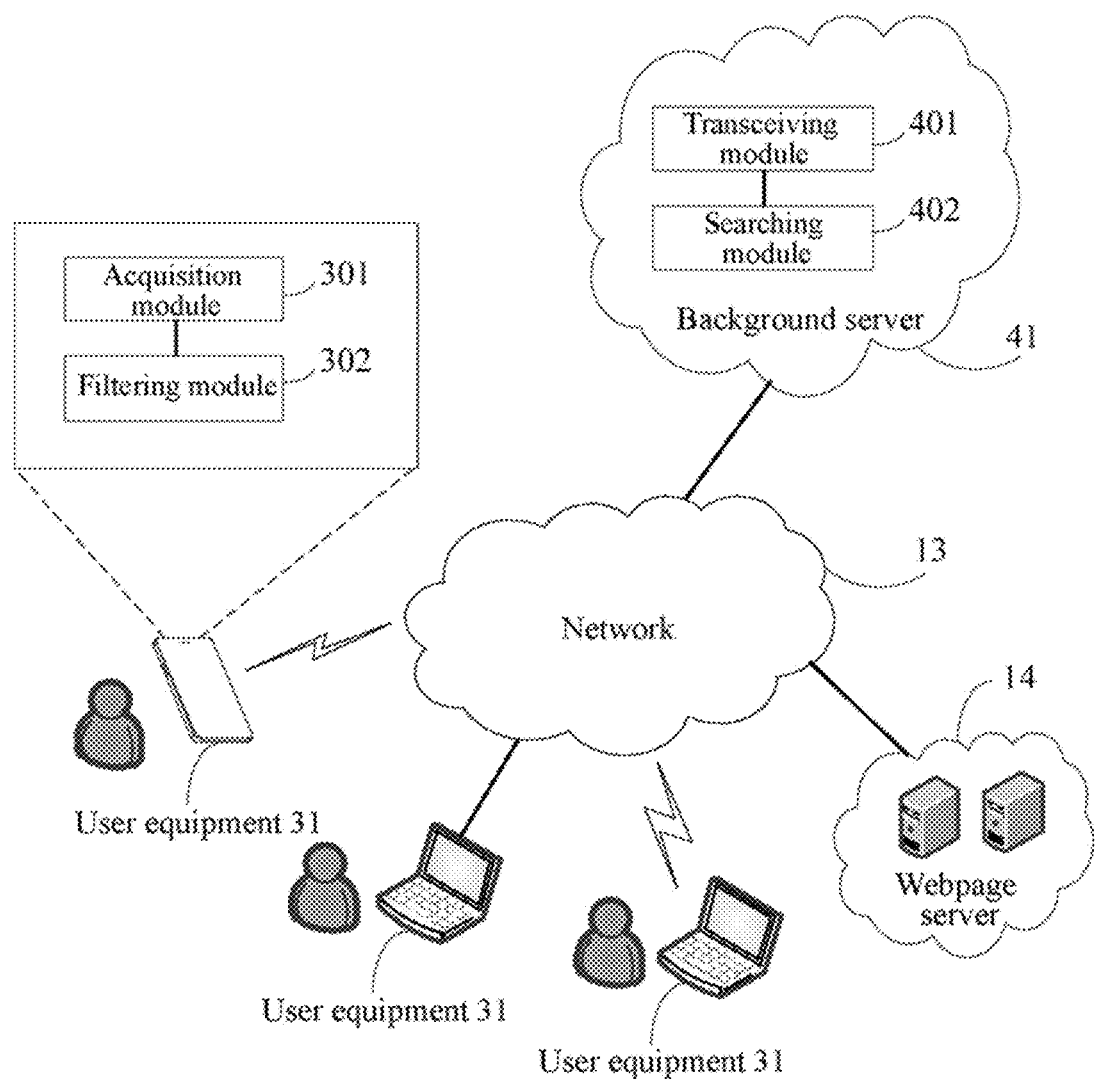
FIG. 10 is a schematic structural diagram of an information processing system according to one embodiment of the present disclosure.

One embodiment discloses an information processing system that can be used for realizing filtering of advertisement information in a webpage, especially for realizing filtering of random-feature advertisement information in a webpage that cannot be filtered by the existing technology. The information processing system in one embodiment includes a terminal and a backend server. The terminal may include any one terminal (user equipment) 31 in the aforementioned embodiment. The backend server may include any one backend server 41 disclosed in the aforementioned embodiment. FIG. 10 gives illustration of the implementation of applying the information processing system disclosed in one embodiment in the application scene shown in FIG. 1. Referring to FIG. 10, the terminal (user equipment) 31 includes an acquisition module 301 and a filtering module 302. The backend server 41 includes a transceiving module 401 and a searching module 402.

Accordingly, since JS corresponding to a target webpage is divided into a JS template corresponding to a plurality of different webpages and a filtering parameter corresponding to the target webpage, a terminal acquires the JS template and the filtering parameter in separated processes. Since a JS template is larger and has a lower variation frequency compared with the filtering parameter, low-frequency update is used for a JS template, and real-time update is used for the filtering parameter, thereby reducing network flow consumed for acquiring JS many times by a user. Meanwhile, the embodiments of the present disclosure use JS with high privilege and capability, and can locate the random-feature advertisement information in a target webpage. In this way, the present disclosure can effectively filter advertisement information including the random-feature advertisement information, saves the network flow of a user, and enhance advertisement filtering performance.

In the embodiments of the present disclosure, if the information processing method is realized in the form of software functional modules and sold or used as an independent product, the information processing method may also be stored in a computer readable storage medium. On the basis of such understanding, an essential part or a part that makes contribution to the existing technology in the technical solution in the embodiments of the present disclosure can be embodied in the form of a software product, and the computer software product is stored in a storage medium, including several instructions that can be used for making a computer device (which may be a personal computer, a server, or a network device) perform all or a part of steps of the method in each embodiment of the present disclosure. The aforementioned storage medium includes various media such as a U disk, a removable hard disk, a Read-Only Memory (ROM), a magnetic disc or an optical disc that can store programmable codes. As such, the embodiments of the present disclosure are not limited to a combination of any specific hardware and software.

Further, one embodiment discloses a computer readable medium that can be an ROM (for example, a Read-Only Memory, a FLASH memory, and a transfer device), a magnetic storage medium (for example, a tape and a magnetic disc drive), an optical storage medium (for example, CD-ROM, DVD-ROM, paper card, paper tape) and other program storages of which the types are well-known. The computer readable medium stores computer executable instructions, and when one instruction is executed, at least one processor performs the following operations: acquiring a JS template for filtering advertisement information from the backend server when determining that a preset update condition is satisfied; acquiring a filtering parameter corresponding to a target webpage from the backend server when detecting that a user requests to access the target webpage; inserting the filtering parameter into the JS template; performing the JS template inserted with the filtering parameter, screening out the advertisement information from the webpage information displayed on the target webpage, and shielding displaying of the advertisement information.

A person skilled in the art may understand that, the embodiments of the present disclosure may be provided as a method, a system, or a computer program product. Therefore, the present disclosure may use a form of a hardware embodiment, a software embodiment, or a combination of a hardware embodiment and a software embodiment. Furthermore, the present disclosure may use a form of a computer program product that is implemented on one or more computer available storage media (including, but not limited to, a magnetic disc storage and an optical storage) that include computer available program codes.

Accordingly, one embodiment of the present disclosure provides a terminal, including: a storage medium configured to store executable instructions; and a processor, configured to execute stored executable instructions, the executable instructions being configured to perform the information processing method at the side of the aforementioned terminal.

Accordingly, one embodiment of the present disclosure provides a backend server, including: a storage medium, configured to store executable instructions; a processor, configured to execute stored executable instructions, the executable instructions being configured to perform the information processing method at the side of the aforementioned server.

The present disclosure is described with reference to flowcharts and/or block diagrams of the method, device (system), and the computer program product in the embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more processes in the flowcharts and/or one or more blocks in the block diagrams is generated by using instructions executed by the general-purpose computer or the processor of another programmable data processing device.

These computer program instructions may also be stored in a computer readable medium that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more processes in the flowcharts and/or one or more blocks in the block diagrams.

In the embodiments of the present disclosure, when determining a preset update condition is satisfied, the terminal acquires a JS template for filtering advertisement information from the backend server; the backend server sends a JS template to the terminal; when detecting that a user requests to access the target webpage, the terminal acquires a filtering parameter corresponding to the target webpage from the backend server; the terminal inserts the filtering parameter into the JS template, executes the JS template inserted with the filtering parameter, screens out advertisement information from the webpage information displayed on the target webpage, and shield displaying of the advertisement information, thereby filtering the advertisement information effectively, saving the network flow of a user, and enhancing advertisement filtering performance.

What is claimed is:

1. An information processing method, comprising:
   acquiring a JavaScript (JS) template for filtering multimedia information from a backend server when determining a preset update condition is satisfied;
   acquiring a filtering parameter corresponding to a target webpage from the backend server when detecting that a user requests to access the target webpage;
   inserting the filtering parameter into the JS template;
   executing the JS template inserted with the filtering parameter, screening out multimedia information from webpage information displayed on the target webpage and shielding displaying of the multimedia information.

2. The information processing method according to claim 1, further comprising: acquiring a set of check parameters corresponding to the target webpage from the backend server when detecting that the user requests to access the target webpage; using the set of check parameters to check the filtering parameter and the JS template respectively; and performing the operation of inserting the filtering parameter into the JS template when determining a check result satisfies a preset check condition.

3. The information processing method according to claim 1, wherein the acquiring the filter parameter corresponding to the target webpage from the backend server when detecting that the user requests to access the target webpage comprises: requesting the filtering parameter corresponding to the target webpage from the backend server when detecting that the user sends a webpage access request to a server of the target webpage.

4. The information processing method according to claim 1, wherein the acquiring the filter parameter corresponding to the target webpage from the backend server when detecting that a user requests to access the target webpage comprises: forwarding a webpage access request to the backend server when detecting that the user sends the network access request to a server of the target webpage, so as to instruct the backend server to send back the filtering parameter corresponding to the target webpage.

5. The information processing method according to claim 1, wherein the executing the JS template inserted with the filtering parameter, screening out multimedia information from webpage information displayed on the target webpage and shielding displaying of the multimedia information comprises: executing the JS template inserted with the filtering parameter and locating random-feature multimedia information in webpage information displayed on the target webpage; and shielding displaying of the random-feature multimedia information in the target webpage.

6. The information processing method according to claim 1, wherein the acquiring the JavaScript JS template for filtering multimedia information from the backend server when determining the preset update condition is satisfied comprises: sending a JS template update request message to the backend server when determining that an update timer exceeds a threshold, so as to trigger the backend server to judge whether to update the JS template; receiving a JS template update response message sent back by the backend server; and updating the JS template according to the JS template update response message.

7. The information processing method according to claim 1, further comprising: when detecting that the user requests to access the target webpage and the terminal stores the filtering parameter corresponding to the target webpage, sending a parameter update request message indicating that the terminal stores the filtering parameter corresponding to the target webpage to the backend server, so as to trigger the backend server to judge whether to update the filtering parameter; receiving a parameter update response message sent back by the backend server; updating the filtering parameter corresponding to the target webpage according to the parameter update response message.

8. The information processing method according to claim 2, wherein the using the set of check parameters to check the filtering parameter and the JS template respectively comprises: using the set of check parameters to check the filtering parameter corresponding to the target webpage; using the set of check parameters to check the JS template that is corresponding to a plurality of different webpages and is used to filter the multimedia information.

9. The information processing method according to claim 1, wherein the acquiring the filtering parameter corresponding to the target webpage from the backend server comprises: sending a message for requesting the filtering parameter corresponding to the target webpage to the backend server; receiving a parameter response message fed back by the backend server; analyzing the parameter response message to obtain the filtering parameter that is corresponding to the target webpage and is encrypted; and using a preset key to decrypt the encrypted filtering parameter to obtain a filtering parameter corresponding to the target webpage.

10. A terminal comprising:
a memory storing computer instructions; and
a processor that, when executing the computer instructions, configured to:
acquire a JavaScript (JS) template for filtering multimedia information from a backend server when determining a preset update condition is satisfied;
acquire a filtering parameter corresponding to a target webpage from the backend server when detecting that a user requests to access the target webpage;
insert the filtering parameter into the JS template;
execute the JS template inserted with the filtering parameter, screen out multimedia information from webpage information displayed on the target webpage, and shield displaying of the multimedia information.

11. The terminal according to claim 10, wherein the processor is further configured to:
acquire a set of check parameters corresponding to the target webpage from the backend server when detecting that the user requests to access the target webpage;
use the set of check parameters to check the filtering parameter and the JS template respectively; and
when determining that a check result satisfies a preset check condition, inserting the filtering parameter into the JS template.

12. The terminal according to claim 10, wherein the processor is configured to request for the filtering parameter corresponding to the target webpage from the backend server when detecting the user sends a webpage access request to a server of the target webpage.

13. The terminal according to claim 10, wherein the processor is configured to execute the JS template inserted with the filtering parameter, locate random-feature multimedia information in webpage information displayed on the target webpage, and shield displaying of the random-feature multimedia information on the target webpage.

14. The terminal according to claim 10, wherein the processor is configured to:
send a JS template update request message to the backend server when determining that an update timer exceeds a threshold, so as to trigger the backend server to judge whether to update the JS template;
receive a JS template update response message sent back by the backend server;
update the JS template according to the JS template update response message.

15. The terminal according to claim 10, wherein the processor is configured to:
use a first check parameter to check a filtering parameter corresponding to the target webpage; and
use a second check parameter to check the JS template that is corresponding to a plurality of different webpages and is used to filter multimedia information.

16. A non-transitory computer readable storage medium storing computer instructions that, when being executed by a processor of a terminal, cause the processor to perform a plurality of operations comprising:
acquiring a JavaScript (JS) template for filtering multimedia information from a backend server when determining a preset update condition is satisfied;
acquiring a filtering parameter corresponding to a target webpage from the backend server when detecting that a user requests to access the target webpage;
inserting the filtering parameter into the JS template;
executing the JS template inserted with the filtering parameter, screening out multimedia information from webpage information displayed on the target webpage and shielding displaying of the multimedia information.

17. The non-transitory computer readable storage medium according to claim 16, wherein the plurality of operations further comprises: acquiring a set of check parameters corresponding to the target webpage from the backend server when detecting that the user requests to access the target webpage; using the set of check parameters to check the filtering parameter and the JS template respectively; and performing the operation of inserting the filtering parameter into the JS template when determining a check result satisfies a preset check condition.

18. The non-transitory computer readable storage medium according to claim 16, wherein the acquiring the filter parameter corresponding to the target webpage from the backend server when detecting that the user requests to access the target webpage comprises: requesting the filtering parameter corresponding to the target webpage from the backend server when detecting that the user sends a webpage access request to a server of the target webpage.

19. The non-transitory computer readable storage medium according to claim 16, wherein the acquiring the filter parameter corresponding to the target webpage from the backend server when detecting that the user requests to access the target webpage comprises: forwarding a webpage access request to the backend server when detecting that the user sends the network access request to a server of the target webpage, so as to instruct the backend server to send back the filtering parameter corresponding to the target webpage.

20. The non-transitory computer readable storage medium according to claim 16, wherein the executing the JS template inserted with the filtering parameter, screening out multimedia information from webpage information displayed on the target webpage and shielding displaying of the multimedia information comprises: executing the JS template inserted with the filtering parameter and locating random-feature multimedia information in webpage information displayed on the target webpage; and shielding displaying of the random-feature multimedia information in the target webpage.

* * * * *